May 15, 1928. 1,670,246
E. T. FERNGREN
DRAWING SHEET GLASS
Filed June 11, 1923 2 Sheets-Sheet 1
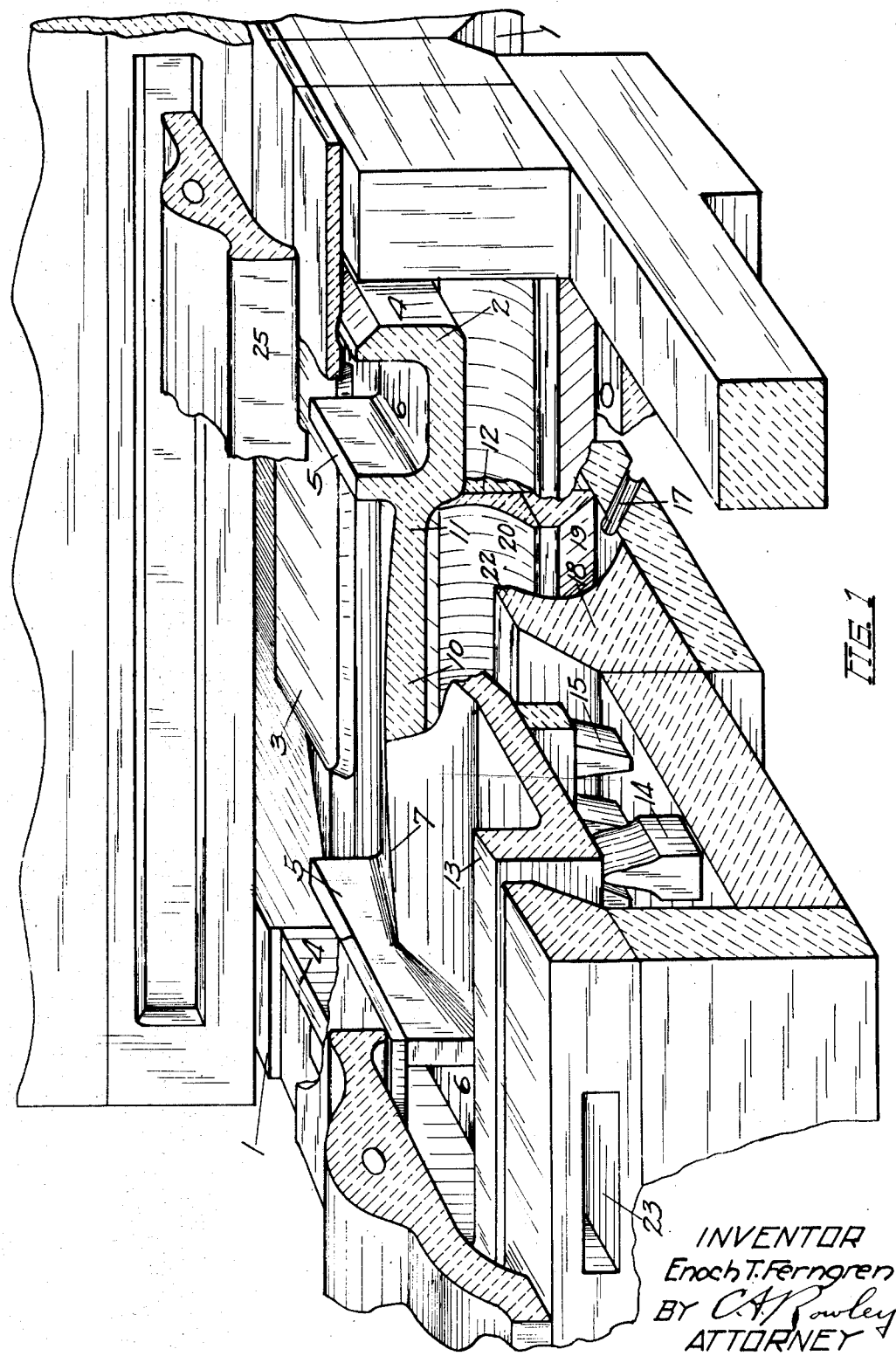
INVENTOR
Enoch T. Ferngren
BY C. A. Rowley
ATTORNEY

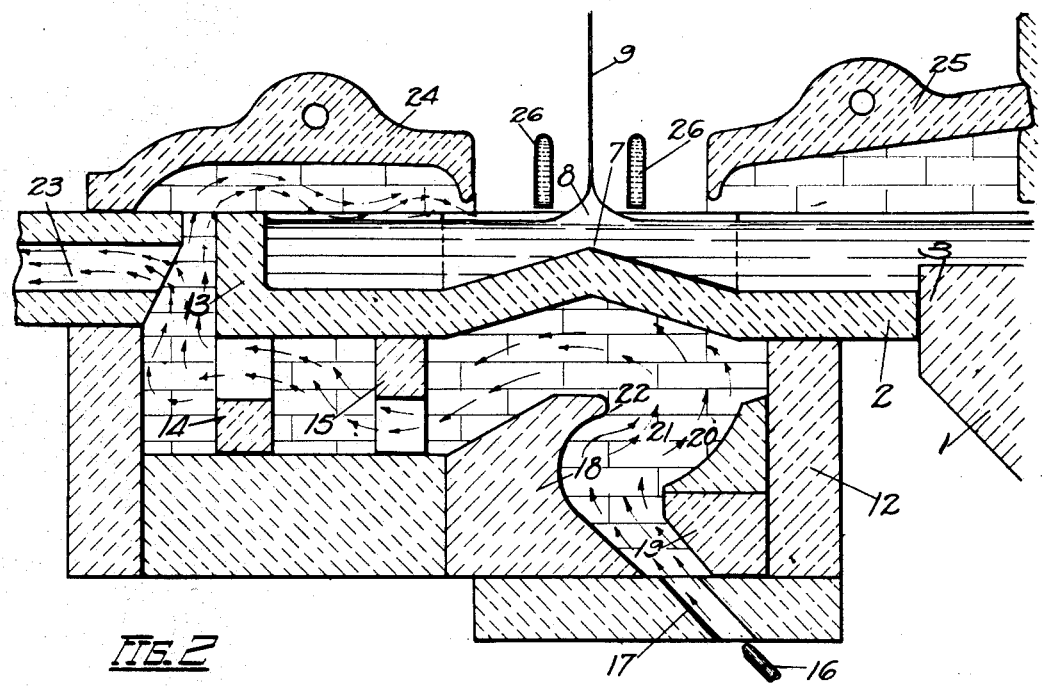
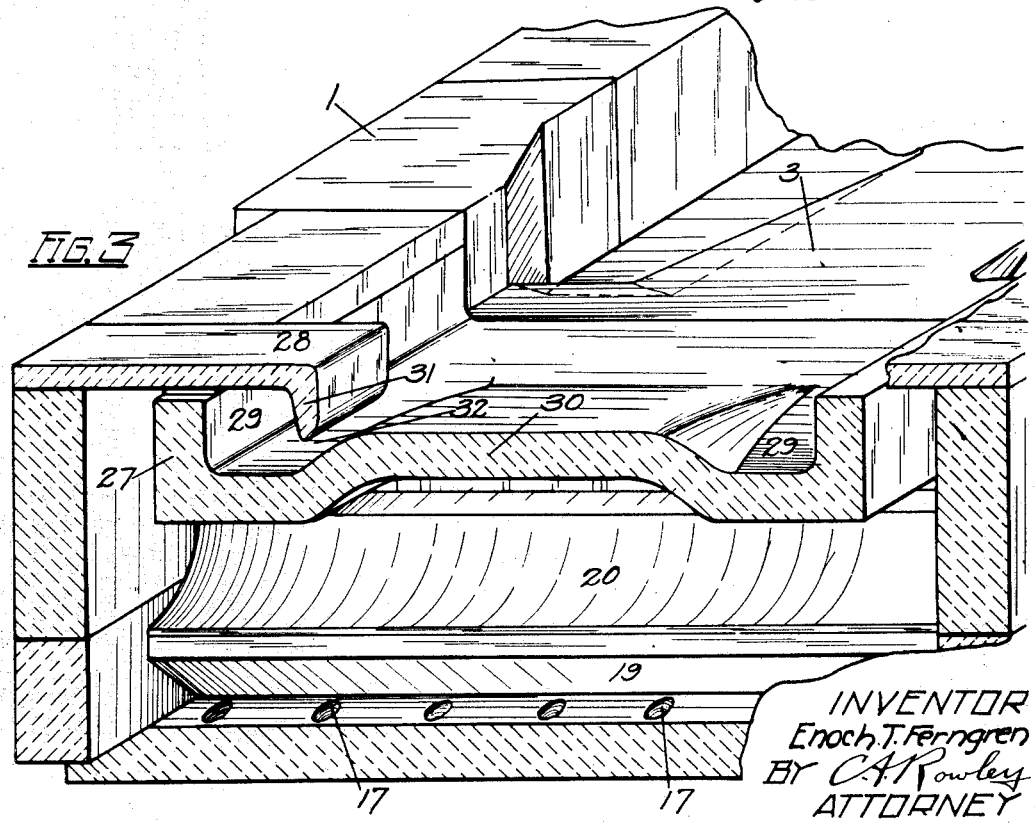

Patented May 15, 1928.

1,670,246

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

DRAWING SHEET GLASS.

Application filed June 11, 1923. Serial No. 644,600.

This invention relates to improvements in the art of drawing sheet glass, and more particularly to an improved form of draw-pot or container for the pool of molten glass from the surface of which the sheet of glass is drawn upwardly.

In the system of drawing sheet glass disclosed in the patent to Colburn, 1,248,809, granted Dec. 4, 1917, the sheet is drawn from the exposed upper surface of a pool of molten glass contained in a shallow receptacle which is closed at one end and in open communication at the other end with a continuous tank furnace. The receptacle for the pool of molten glass is supported over a heated chamber which keeps the glass in the receptacle at the proper working temperature. The cooling of the exposed surface glass of the pool adjacent the point of draw is accelerated by auxiliary cooling means so that this glass will assume a sufficiently plastic and tenacious condition to be drawn rather rapidly into sheet form. The exposed upper surface of the flow of glass entering the drawing receptacle from the furnace will obviously be more tenacious and of a quicker setting nature than the substratum glass flowing in beneath it. That face of the sheet adjacent the furnace will be drawn directly from this more tenacious glass, but the glass which supplies the opposite face of the sheet must flow under the sheet source toward the closed end of the receptacle. This substratum glass will be of a softer nature and require more time for hardening than the glass first mentioned. These different states of consistency in the glass which forms the opposite surfaces of the sheet are responsible for different conditions in tractibility and different states of surface tension in the sheet as it is progressively drawn from the supply in the pot. Also the different temperature conditions that exist between the surface glass in the closed end of the pot and the surface stratum coming in from the melting tank, and variations in the temperature of different portions of the supplying current that enters the receptacle from the furnace, all set up troublesome conditions in the sheet during its formative period, which sometimes cause irregularities and inequalities in the drawn sheet.

The object of the present invention is to overcome these difficulties by providing a uniform flow of molten glass of like consistency to both faces of the sheet. Side channels are provided to convey portions of the stream of molten glass entering the receptacle, around the side edges of the drawn sheet to the closed end of the pot. By thus delivering surface glass to the side of the sheet opposite the furnace, the two surface skins of the sheet will be composed of glass of like consistency, which will promote uniformity in surface-tension, and thus eliminate one cause of defects in the sheet.

Another object of the invention is to provide an improved design of heating chamber for heating the glass in the pot adjacent the sheet source uniformly, and thus eliminate the possibility of cold streaks in the forming sheet. To assist in maintaining this uniform temperature in the sheet source, the bottom of the container beneath the line of draw of the sheet is suitably arched, to vary the depth of glass in the pot as well as the thickness of the container at different points across the width of the sheet.

The invention will be better understood from the following detailed description of certain forms of apparatus embodying the principles of this invention.

In the accompanying drawings:

Fig. 1 is a perspective view of portions of the draw-pot and heating chamber, parts of the structure being shown in vertical section, and parts being broken away to facilitate the disclosure.

Fig. 2 is a longitudinal vertical section through the structure shown in Fig. 1.

Fig. 3 is a perspective, similar to Fig. 1, showing a somewhat modified form of container.

We will first refer to the form of apparatus disclosed in Figs. 1 and 2. As 1 is shown the outlet end of that portion of the tank furnace from which the glass flows into the draw-pot or container 2. It will be noted that an elevated ridge portion 3 is formed in the center of the outlet from the glass supplying tank. This is to retard the more highly heated and freely flowing glass in the center of the stream, and offset the cooling effect and the frictional resistance offered to the side portions of the stream by the side walls of the tank. In this way a more equal flow of glass will enter the receptacle 2 across its entire width.

Spaced inwardly a suitable distance from each side wall 4 of receptacle 2, is a parallel vertical wall 5. In this way a pair of side channels 6 are formed between the walls 4 and 5, and a wider main passage, approximately equal to the width of the sheet to be drawn, is formed between the two inner walls 5. The bottom portion of the container between the partitions 5 is arched upwardly as best shown in Fig. 2, the crown 7 of the arch lying directly under the source 8 of glass sheet 9. This arched bottom considerably diminishes the depth of the glass beneath the sheet source and retards the direct flow of glass from the furnace beneath the sheet to the closed end of the pot. In this way the supply of glass for the closed end of the pot must, for the most part, pass through the side passages 6. Furthermore, the arched bottom so strengthens this portion of the pot that no supports are necessary directly beneath the sheet source, so that a more uniform distribution of heat may be imparted to all portions of the glass in the vicinity of the forming sheet. This feature of the invention will be referred to more in detail later on.

The crown 7 previously referred to, is also arched upwardly in the plane of the sheet as shown in Fig. 1. In this way the central portion of the container bottom as at 10 is thicker than the side portions 11 which are beneath the edges of the sheet. Furthermore the portions of the molten pool below the edges of the sheet will be somewhat deeper than the central portion of the pool. Both of these factors contribute to counteract the cooling and glass movement retarding tendency of the side walls 5, and thus maintain a more uniform and even heat across the entire width of the sheet source with a relatively greater clearance for glass movement adjacent the side walls 5.

The container 2 is supported adjacent its open end upon the rear wall 12 of the heating chamber which supplies heat to the molten pool. The closed end 13 of the pot is carried by two spaced rows of arched stools 14 and 15, within the heating chamber. It will be noted that there are no supports directly under the arched portion 7 of the container.

The burners 16 direct their flames diagonally upward through ports 17 in the bottom of the chamber. The bottom portion of the furnace adjacent the sides of the ports 17 is formed by a series of suitably curved blocks 18, 19 and 20, which leave between them a tortuous passage 21 through which the heated gases must pass before they encounter the arched lower surface of the container 2. The gas and air entering through ports 17 will encounter, and be deflected by, the overhanging lip 22 of block 18 before combustion has been completed. In this way the several entering streams of gas and air will be thoroughly mixed and deflected so that an even flow of heated gases and products of combustion will be directed upwardly against the arched roof of the chamber. These heated gases will pass around beneath the sheet source as indicated by the arrows, thence through the open passages in the supporting stools 15 and 14, around closed end 13 of the container 2 and out through the flue 23.

A certain portion of the surface glass adjacent the sheet source 8 is exposed to the open air, the remainder of the surface glass in the receptacle being enclosed by cover tiles 24 and 25 to maintain desirable heat conditions in these portions of the molten pool. As noted above, the surface glass just before it is drawn into the sheet is rapidly cooled by the water-coolers 26 arranged parallel to and adjacent the sheet source 8. These coolers reduce the glass to the proper plastic condition just before it is drawn into the sheet 9.

In operation, the glass which is drawn into the side of sheet 9 facing the supply tank 1, will flow directly in between the partitions 5 to the sheet source 8. The arched bottom 7 of the container will retard the flow of the substratum glass below the sheet source 8 to the closed end 13 of the receptacle so as to limit the central flow of molten glass between the partitions 5 to substantially the amount of glass needed to be drawn into the side of sheet 9 adjacent the furnace. The two side streams of molten glass will flow freely through the deep side passages 6 to the closed end of the pot from which they flow back between the partitions 5 to supply the opposite face of the sheet 9 in a manner exactly similar to that already described. In this way a supply of surface glass of the same consistency and subject to the same retarding conditions and temperature regulations will be provided for the side of the sheet opposite the supply tank. With the drawing conditions equal and the glass supply of the same temperature and consistency, the two faces of the sheet will be uniform and all objectionable inequalities in surface tension between the two faces of the sheet will be eliminated.

By means of the crowned portion 7 of the bottom of the container which is arched in both directions, as previously described, the heat delivered to the molten pool through the bottom of the pot will be so distributed as to secure a uniform and even temperature in the molten glass from one side of the pot to the other, thus eliminating any source of cold streaks in the sheet 9.

In Fig. 3, a slightly modified form of container 27 is shown. In this form the side partition walls 5 are omitted. The cover tiles 28 for the side passages 29 at the edges of the central arched portion 30, have downturned lips 31 which project into the molten glass and function somewhat the same as partitions 5, previously described, to separate the streams of glass flowing along the sides of the pot from the central stream which is drawn directly into the surface of the sheet which faces the supply tank. The open passages 32, between the lower edge of lips 31 and the bottom of the receptacle, provide open passages through which a certain amount of glass may pass laterally from the deeper edge currents to the central sheet forming bodies of glass. This open communication tends to avoid the possible formation of dog-metal or devitrified glass which may accumulate in stagnant corners of a receptacle or passage.

Claims:

1. In sheet glass apparatus, the combination with a container for the pool of molten glass from which the sheet is drawn, of means for retarding the flow of the glass flowing toward the point of draw, said means including a raised portion formed in the floor of the container, said raised portion having two inclined sides and an arched upper edge.

2. That improvement in the art of drawing a sheet of glass upwardly from the surface of a pool of molten glass, which consists in providing a direct central flow of surface glass from the source of molten glass to one side of the forming sheet, retarding the central flow of substratum glass and providing two side flows of surface glass from the same source, around the sheet edges, to supply the other face of the sheet.

3. That improvement in the art of drawing a sheet of glass upwardly from the surface of a pool of molten glass, which consists in providing a direct central flow of surface glass from the source of molten glass to one side of the forming sheet, and providing two side flows of surface glass from the same source, around the sheet edges, to supply the other face of the sheet, and retarding the central flow beneath the sheet source more than the side flows.

4. That improvement in the art of drawing sheet glass, consisting in providing a deeper flow of molten glass to the sources of the sheet edges than to the source of the central portion of the sheet and supplying more heat to these edge portions to offset the retardation caused by the walls of the container.

5. In a sheet glass drawing mechanism, a container for the pool of molten glass from which the sheet is drawn, the container being closed at one end parallel to the line of draw of the sheet, and open at the opposite end to provide an entrance for the molten glass, and being formed with a pair of separate side channels, beyond the edges of the sheet, to conduct surface glass from the open end of the container to the closed end thereof.

6. In a sheet glass drawing mechanism, a container for the pool of molten glass from which the sheet is drawn, the bottom of the container being arched upwardly at right-angles to the plane of the sheet, with the summit of the arch beneath the sheet source, the container being closed at one end parallel to the line of draw of the sheet, and open at the opposite end to provide an entrance for the molten glass, and being formed with a pair of separate side channels, beyond the edges of the sheet, to conduct surface glass from the open end of the container to the closed end thereof.

7. The combination with a source of molten glass, and a sheet glass drawing mechanism, of a container for the pool of molten glass from which the sheet is drawn, the container being in open communication at one end with the source of molten glass and closed at the other end, the container comprising a main central passage wherein surface glass flows directly to one side of the sheet, said main central passage being provided with means for retarding the central flow of substratum glass, and a pair of side passages through which glass flows to the closed end of the container to supply the other side of the sheet.

8. The combination with a source of molten glass, and a sheet glass drawing mechanism, of a container for the pool of molten glass from which the sheet is drawn, the container being in open communication at one end with the source of molten glass and closed at the other end, the container comprising a main central passage wherein glass flows directly to one side of the sheet, and a pair of side passages through which glass flows to the closed end of the container to supply the other side of the sheet, the depth of the central passage being diminished beneath the sheet source to retard the flow of substratum glass beneath the sheet.

9. The combination with a container for a pool of molten glass from which a sheet of glass is drawn, of a heating chamber beneath the container, the bottom of the container being arched beneath the sheet source to form the roof of the chamber, the chamber having a plurality of inlet ports for the burners, and a deflector for distributing and mixing the flow of heated gases before they reach the arched roof.

10. The combination with a container for a pool of molten glass from which a sheet of glass is drawn, of a heating chamber beneath the container, the bottom of the container being arched beneath the sheet source to form the roof of the chamber, the chamber having a plurality of inlet ports for the burners, and a tortuous passage through which the heated gases pass before they reach the arched roof.

Signed at Toledo, in the county of Lucas and State of Ohio, this 6th day of June, 1923.

ENOCH T. FERNGREN.